Oct. 9, 1962 H. MANN ET AL 3,057,962

SYNCHRONIZATION OF PULSE COMMUNICATION SYSTEMS

Filed Dec. 5, 1960

INVENTORS H. MANN
J. S. MAYO
BY R. B. [signature]
ATTORNEY

United States Patent Office 3,057,962

Patented Oct. 9, 1962

3,057,962

SYNCHRONIZATION OF PULSE COMMUNICATION SYSTEMS

Henry Mann and John S. Mayo, Berkeley Heights, N.J., assignors to Bell Telephone Laboratories, Incorporated, New York, N.Y., a corporation of New York Filed Dec. 5, 1960, Ser. No. 73,873
9 Claims. (Cl. 179—15)

Figures 1, 2:
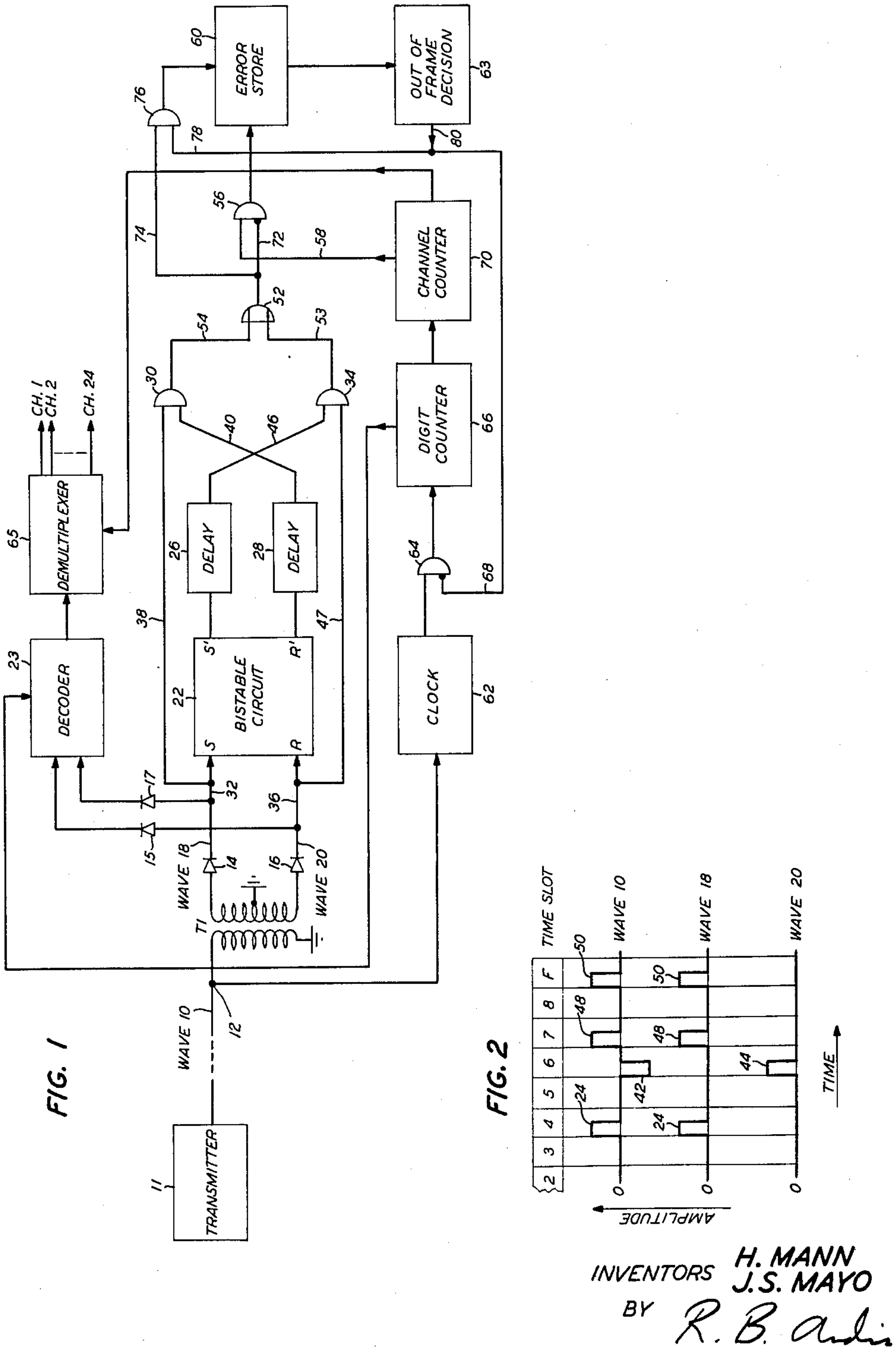

This invention relates to pulse communication systems. In particular, it concerns the synchronization of remotely dispersed transmitters and receivers of such systems.

Among the advantages of certain pulse communication systems is the ease with which great numbers of information channels can be multiplexed by time division in an array of periodically recurrent frames. This advantage is not without its problems, for transmitters and receivers of multiplexed pulse code must be maintained in substantially perfect synchronism if chaos is to be avoided. A transmitter and an associated receiver are in synchronism when they are "in frame," which simply means that each channel recurrently has exclusive use of the transmission system for a specified time during each of a succession of time intervals called frames.

Many approaches to this problem of synchronization have been proposed. One approach is to use a so-called "winking" framing pulse, an approach exemplified by Patent No. 2,527,638, which issued to J. G. Kreer et al. on October 31, 1951 and Patent No. 2,927,965, which issued to R. R. Waer on March 8, 1960. Very briefly, the "winking" method of synchronization employs a framing pulse which recurs once every other frame. In a succession of frames the framing information takes the form of a pulse, no pulse, a pulse, etc. The framing pulse thus "winks," so to speak.

Another approach is that of Patent No. 2,546,316, which issued to E. Peterson on March 27, 1951. The framing pulse employed by Peterson is distinguished from the message pulses by its duration. It appears in every frame and consists of an unbroken sequence of $n+1$ pulses, bounded on each end by a space, where $n$ is the number of digits employed to represent any message value.

Still another approach is that of Patent No. 2,861,128, which issued to S. Metzger on November 18, 1958, and Patent No. 2,483,411, which issued to D. D. Grieg on October 4, 1949. The framing pulse employed by Metzger and Grieg is a double pulse—a pair of equal-valued, closely-spaced pulses—and it occurs once per frame.

Each of the above methods of synchronization has its advantages and disadvantages. For example, the method proposed by one of the references cited above requires an average of 0.072 second for resynchronization after the system has gone out of frame, an intolerable length of time in view of the great speed presently demanded of multiplexed pulse communication systems.

It is an object of the present invention not only to increase the speed with which an out-of-frame condition can be remedied, but also to accomplish framing by means of a single pulse uniquely coordinated with the message pulses so that its identity is immediately and unequivocally established. And it is an object of the invention to accomplish these ends with minimal circuit complexity. As will be seen, very few additions need be made to the basic structure of a multiplexed pulse communication receiver in order that the objects of the invention may be accomplished.

In accordance with the invention each framing pulse, generated externally at the transmitter, is of the same polarity as the next preceding message pulse, whenever and wherever that message pulse may occur in the frame. The message pulses are bipolar and take the form of a pseudo-ternary pulse train. At the receiver a network separates the incoming pulses, according to their polarity, into two pulse trains and then conveys the pulse trains to a gate. The gate passes framing information only. The receiver generates internal framing pulses and compares them with the external framing pulses. If respective external and internal framing pulses do not coincide in time, all such discrepancies are recorded and, after an intolerable number of these, the generation of internal framing information is discontinued pending the arrival of the next external framing pulse.

The various objects and features of this invention will become more apparent after a consideration of the following discussion and the drawing to which it relates. In the drawing:

FIG. 1 is a block schematic diagram of a framing circuit arranged in accordance with the invention; and FIG. 2 is a plot of wave forms to assist in an understanding of FIG. 1.

In the discussion that follows, reference often will be made to wave forms appearing at various indicated points in the circuit of FIG. 1. These wave forms, products of pulse code modulation (PCM), are plotted in FIG. 2. They are shown for illustrative purposes only; and, for these purposes, may be identified as representative of a binary code. Since they are pseudo-ternary in form, they could represent a permutation code having other than a binary base.

It will be noted that FIG. 2 is a partial timing diagram, since only a small portion of a frame is shown. Later, in discussing the internal framing process of FIG. 1, it will be assumed that each frame consists of 193 time slots. To each of these time slots a digit (pulse or space) is allotted. The time slot marked F is reserved for framing pulses. The number of time slots encompassed by a frame is determined by the number of digits and channels. This time division will be explored further as the description progresses.

A bipolar wave 10, received at the terminal 12 from a PCM transmitter 11, passes through the transformer T1 and emerges from the diode pair 14 and 16 in unipolar form as shown by the waves 18 and 20. Diode 14 supplies the wave 18 to the input terminal S of the bistable circuit 22. Diode 16 supplies the wave 20 to the input terminal R of the bistable circuit 22. The diodes 15 and 17 supply unipolar PCM to a decoder 23.

The AND gate 30 is enabled only when there is a concurrence of impulses from the line 32 and the delay circuit 28. Similarly, the AND gate 34 is enabled only when pulses are supplied simultaneously from the line 36 and the delay circuit 26. The delay circuits 26 and 28 each provide a delay interval substantially equal to the width of pulses in the incoming wave 10. The width of these pulses is approximately a half time slot, so that the delay intervals provided by the delay circuits 26 and 28 are each substantially equal to a half time slot.

Assume that the output terminals R′ and S′ of bistable circuit 22 are initially in the "0" and "1" binary states, respectively. Pulse 24, the first pulse of wave 18 (and of wave 10) causes the bistable circuit 22 to change state. The states of the output terminals R′ and S′ thus become "1" and "0," respectively. The impulse now manifest on the output terminal R′ is not immediately effective to enable the input 40 of AND gate 30, since the delay interval of delay circuit 28 must first be overcome. In the meantime, the pulse 24 has enabled the input 38 of AND gate 30—but to no avail, since it is necessary that stimuli be concurrent at all of the inputs of an AND gate if the gate is to be enabled. When the delay interval of delay circuit 28 is finally overcome, the pulse 24 will have expired. The inputs of AND gate 30 thus will have been enabled one at a time but not simultaneously.

Pulse 42, the second pulse of wave 10, becomes pulse 44 of wave 20. Diode 16 supplies pulse 44 to the input terminal R of bistable circuit 22. Pulse 44 causes the bistable circuit 22 to revert to its initial state of equilibrium. The binary states of the output terminals R′ and S′ thus again become "0" and "1," respectively.

Just as the delay circuit 28 prevented the pulse 24 of wave 18 from enabling the AND gate 30, so too the delay circuit 26 prevents the pulse 44 from enabling the AND gate 34.

Pulse 48, the third pulse of wave 10, appears on line 32 as the second pulse of wave 18. Pulse 48 causes the bistable circuit 22 to change state again, so that its output terminals R′ and S′ are once more respectively in the "1" and "0" states. Just as before, the delay circuit 28 is effective to prevent the pulse 48 from enabling the AND gate 30.

Pulse 50, the fourth pulse of wave 10, appears on line 32 as the third pulse of wave 18. Pulse 50 is immediately and unequivocally identified as a framing pulse, since it is of the same polarity as was the next preceding pulse 48. The enablement of either AND gate 30 or AND gate 34 will occur only when a framing pulse such as pulse 50 has been received at the receiver input terminal 12. It is the bistable circuit 22 and its associated circuitry (in this case delay circuit 28 and the AND gate 30) that will recognize and accept the pulse 50 as a framing pulse. The manner of recognition and acceptance will now be explained.

It was mentioned above that the pulse 48 caused the output terminals R′ and S′ to assume the "1" and "0" states, respectively. At the time the pulse 50 appears at the input 38 of AND gate 30, this AND gate is ready to be enabled, for the half-time-slot delay of circuit 28 has been overcome and the binary "1" state of the output terminal R′ has been transferred, as a stimulus, to the input 40 of AND gate 30. Consequently, pulse 50, upon energizing the input 38, will complete the conditions required for the enablement of AND gate 30.

The OR gate 52 is therefore enabled by the output 54 of AND gate 30 and the inhibit gate 56 is prevented from passing any impulse received at its input 58. The impulses received at the input 58 of the inhibit gate 56 are the internal framing pulses of the receiver. These are generated periodically, once every 193 time slots in the illustrative system now being discussed.

If the receiver is in frame, that is to say, if the internal framing pulse supplied to the input 58 of inhibit gate 56 coincides in time with the external framing pulse received at the input terminal 12, then a pulse is not supplied to the error store circuit 60. This is because the inhibit gate 56 will be enabled only when the receiver is apparently out of frame. It should be noted that the non-coincidence of the internal framing pulse at the input 58 of the inhibit gate 56 and an external framing pulse at the inhibit input 72 may be due not only to an out-of-frame condition at the receiver, but also to the appearance of an erroneous framing pulse in the received wave 10. A noise burst, for example, occurring on the transmission line, could either blot out a bona fide framing pulse or produce one at an incorrect time position.

The internal framing pulse is generated as follows: The so-called clock circuit 62 is an oscillator that produces pulses at the basic repetition rate of the received wave 10. The basic repetition rate may be defined as the product of the sampling frequency at the transmitter 11 and the number of time slots per frame. It will be assumed for purposes of description, that the sampling rate is 8,000 cycles per second and that the number of time slots per frame is 193, the 193rd time slot being reserved for framing information. Consequently, the basic repetition rate of the system is 193 times 8,000 cycles per second or 1.544 megacycles per second. It will be helpful to think of the clock circuit 62 as marking off 1,544,000 time slots per second. This is the frequency of the master oscillator (not shown) at the transmitter 11.

Pulses, corresponding to time slots and generated by the clock circuit 62, are supplied to the inhibit gate 64. They are passed on to the digit counter 66, whenever no inhibit pulse is present at the inhibit input 68 of inhibit gate 64. The digit counter 66 counts off "packages" of eight pulses each and, for every eight-pulse package that it receives, supplies a pulse to the channel counter 70. Each pulse supplied to the channel counter 70 marks off a channel. The channel counter 70 in turn counts off "packages," each consisting of 24 pulses received from the digit counter; and after each 24-pulse package (i.e., 24 channels), supplies the internal framing digit, previously mentioned as the 193rd digit, to the input 58 of the inhibit gate 56.

The digit counter 66 controls the decoding process by supplying each of the pulses, received from the clock circuit 62, to the decoder 23. The demultiplexing gates (not shown) of the demultiplexer 65 are, in turn, controlled by the channel counter 70, which operates these gates in synchronism with the multiplexer (not shown) at the transmitter 11. The demultiplexer 65 then distributes the decoded information to the appropriate channels. As will be understood, decoding and demultiplexing are carried on only so long as the decision circuit 63 has not declared the system to be out of frame.

The number of successive framing errors that can be tolerated by the system is here assumed to be three. These errors are stored in the error store 60. The error store 60 may be an integrating circuit of the resistance-capacitance type. When, in accordance with our assumption, three successive framing errors have been noted by the error store 60, the cumulative voltage built up in the circuit 60 will trigger the out-of-frame decision circuit 63, which in turn will inhibit the inhibit gate 64. The supply of clock pulses from the clock crcuit 62 is at once interrupted, as consequently are the processes of internal framing, decoding, and demultiplexing. The out-of-frame decision circuit 63 is a voltage amplitude detector and may be a Schmitt circuit.

Let us go back now to the chain of events that led to the recognition of the pulse 50 as a framing pulse. And let us assume that the pulse 50 has been blotted out by a noise burst in its journey from the transmitter 11, so that it does not appear at the input 12. Then when the internal framing pulse, which was to have been coincident with pulse 50, is supplied by the channel counter 70 to the input 58 of inhibit gate 56, this gate will be uninhibited and will therefore supply an error pulse to the error store 60. Let us assume further that the two next preceding internal framing pulses were in time with the externally supplied framing information. Then the error store 60 presently will have stored within it a voltage representative only of one supposed framing error. Consequently, the out-of-frame decision circuit 63 will not be triggered, and internal framing information will continue to be produced by the channel counter 70.

If we go on to assume that there is, for one reason or another, a noncoincidence of internal and external framing information when the next two succeeding internal framing pulses are supplied by the channel counter 70 to the input 58 of inhibit gate 56, the error store 60 will have accumulated an error voltage representative of three successive framing errors. This voltage is sufficient to trigger the out-of-frame decision circuit 63. Circuit 63, in turn, inhibits the gate 64. The flow of clock pulses from the clock circuit 62 through the inhibit gate 64 is immediately interrupted. As a consequence, both the digit countr 66 and the channel counter 70 stop their normal functions. Internal framing, decoding, and demultiplexing cease. These processes will not begin again until the next external framing pulse is received. That pulse will appear at the output of OR gate 52 and eventually at the input 74 of AND gate 76. The pulse will enable the AND gate 76, since the input 78 is already energized by the out-of-frame decision circuit 63.

The enablement of AND gate 76 causes a partial depletion of the voltage stored in the error store 60. This partial depletion is proportional to the voltage representative of one framing error. The voltage level of the error store 60 is, therefore, no longer sufficient to maintain the out-of-frame decision circuit 63 in an active state. Consequently, its output 80 goes to the binary "0" state. Being no longer inhibited by the inhibit gate 64, clock pulses from the clock circuit are again supplied to the digit counter 66, which in turn resumes its supply of channel pulses to the channel counter 70.

One frame thereafter, an internal framing pulse will be supplied by the channel counter 70 to the input 58 of the inhibit gate 56. If, at this time, an external framing pulse is received at the inhibit input 72 of inhibit gate 56, it will be known that the receiver is in frame and the error store 60 will thereafter be completed depleted. If, however, an external framing pulse does not appear at the inhibit input 72 of inhibit gate 56, the last-mentioned internal framing pulse at the input 58 of inhibit gate 56 will be passed on to the error store 60 and the voltage level of the error store 60 will again become sufficient to enable the out-of-frame decision circuit 63. The output 80 of the circuit 63 will thereafter inhibit the gate 64 and interrupt the supply clock pulses to the digit counter 66. The process of returning to an in-frame condition will then be repeated.

The number of successive errors that can be tolerated before internal framing is interrupted and the reframing process instituted will depend, of course, upon the particular circumstances encountered in a given system. Perhaps the most important of these circumstances is the nature and frequency of occurrence of line noise. Statistical analyses will indicate the relationship between such noise and the tendency of the system to go out of frame. It should be noted in this respect that all of the framing methods discussed earlier in this specification are also subject to the depredations of line noise. In the absence of line noise, the illustrative framing circuit of FIG. 1 will complete any reframing process within the duration of one frame. The presence of such noise does not necessarily mean that the system will go out of frame. Its presence, however, gives rise to the following possibilities: (1) that both the transmitted framing pulse and the next preceding message pulse will be exactly cancelled out (this is highly improbable); (2) that either of these pulses will be cancelled or have its polarity reversed; (3) that both of these pulses will undergo a polarity change (in which case the framing significance of the pulses is unaffected); or (4) that the amplitude of either or both of these pulses will be increased by a noise burst of like polarity (here, too, the framing significance of the pulses is unaffected). Of the four possibilities mentioned, the third or the fourth is more likely to occur than the first or the second. This is encouraging, therefore, since the framing significance of the relevant pulses is not affected in Cases 3 and 4.

Although the invention has been described with reference to a specific circuit, the invention should not be deemed limited to this illustrative embodiment. Other embodiments will readily occur to those skilled in the art.

What is claimed is:

1. In a synchronous pulse communication system employing a pseudo-ternary pulse code, each frame of which consists of message pulses and an external framing pulse of like polarity with the last message pulse of the frame, wherever and whenever said last message pulse may occur in the frame, a receiver including an internal framing circuit which comprises a first gate, means responsive only to successive pulses of positive polarity for enabling said first gate, a second gate, means responsive only to successive pulses of negative polarity for enabling said second gate, said first and second gates each producing an output pulse when enabled, means to generate internal framing pulses, means interconnecting said last-named means with said first and second gates to compare the occurrence in time of said internal framing pulses and the output pulses of said first and second gates, means connected to said comparing means to record any discrepancy between the occurrence of said internal framing pulses and said output pulses, and means connected to said recording means and responsive to a predetermined number of said discrepancies to interrupt the generation of said internal framing pulses until the reception of the next external framing pulse.

2. In a receiver of a synchronous pulse communication system employing bipolar pulse code modulation and employing an externally derived framing pulse of like polarity with the last message pulse of any frame, wherever and whenever said last message pulse may occur in the frame, a framing circuit at said receiver comprising means to segregate, into separate waves, the positive and negative pulses of said bipolar pulse code modulation and to convert said positive and negative pulses to pulses of the same polarity; a bistable circuit having a pair of inputs and a pair of outputs; means to convey each of said segregated waves to an individually associated one of said bistable circuit inputs, said bistable circuit changing state upon the application of a pulse to either of its inputs; a pair of AND gates each having an output and a pair of inputs; a pair of delay circuits each interconnecting one of said inputs of each of said AND gates with a respective one of the outputs of said bistable circuit, the other of said inputs of each of said AND gates being connected to a respective one of the inputs of said bistable circuit; means to generate an internal framing pulse comprising a pulse generator whose basic repetition rate is substantially equal to the basic repetition rate of said system, a digit counter, and a channel counter connected in the order named; means, interconnecting said means to generate said internal framing pulse and said outputs of said AND gates, to compare the occurrence in time of said external framing pulse and said internal framing pulse; means to record any nonconcurrence of said framing pulses; and means responsive to a predetermined number of said nonconcurrences to interrupt the generation of said internal framing information until the reception of the next external framing pulse.

3. Apparatus as defined in claim 2 in which said means to compare the occurrence in time of said external framing pulse and said internal framing pulse comprises an inhibit gate having a pair of inputs, an OR gate connecting said outputs of said AND gate to the inhibit input of said inhibit gate, and means connecting said channel counter to the other input of said inhibit gate.

4. Apparatus as defined in claim 2 in which said pulse generator and said digit counter are interconnected by an inhibit gate responsive to said last-named means to inhibit the flow of pulses from said pulse generator to said digit counter.

5. Apparatus as defined in claim 2 in which the delay period provided by said delay circuits in transferring impulses from said outputs of said bistable circuit to the respective inputs of said AND gates is substantially equal to the duration of the pulses of said bipolar pulse code modulation.

6. In a synchronous pulse communication system employing bipolar pulse code modulation, each frame of which consists of message pulses and an external framing pulse having the same polarity as the next preceding message pulse, wherever and whenever in the frame said message pulse may occur, a receiver including an internal framing circuit which comprises unilaterally conductive means to segregate said bipolar pulse code into two separate pulse trains of like polarity; gating means, interconnecting said unilaterally conductive means and said internal framing circuit, to prevent the passage of the message pulses of said pulse trains and to pass only the external framing pulse thereof; means to generate an internal framing pulse; means interconnecting said generating means and said gating means to compare the occurrence in time of said external and said internal framing pulses; means connected to said comparing means to record any discrepancy between the occurrence of said framing pulses; and means connected to said recording means and responsive to a predetermined number of said discrepancies to interrupt the generation of said internal framing information until the reception of the next external framing pulse.

7. Apparatus as defined in claim 6 in which said means to generate an internal framing pulse comprises a pulse generator, whose basic repetition rate is substantially equal to the basic repetition rate of said bipolar pulse code modulation, a digit counter and a channel counter, said generator and said counters being tandem-connected in the order named.

8. Apparatus as defined in claim 7 including an inhibit gate having an output and a pair of inputs, one of said inputs inhibiting the other when said one is energized, said inhibit input being connected to said means to interrupt the generation of said internal framing information, said other input being connected to said pulse generator, and said output being connected to said digit counter.

9. In a synchronous pulse communication system employing a pseudo-ternary pulse code, each frame of which consists of message pulses and an external framing pulse of like polarity with the last message pulse of the frame, wherever and whenever said last message pulse may occur in the frame, a receiver including an internal framing circuit which comprises unilaterally conductive means to segregate said pulse code into two separate wave trains of like polarity; means to detect said external framing pulse, blocking said message pulses and passing only said external framing pulse; means to generate an internal framing pulse comprising a pulse generator having substantially the same basic repetition rate as said incoming pulse code, a digit counter, and a channel counter, connected in the order named; means to compare the occurrence in time of said external and said internal framing pulses, comprising an inhibit gate interconnecting said means to generate an internal framing pulse and said detecting means, said inhibit gate being responsive to the passage of any external framing pulse through said detecting means to prevent the simultaneous passage of said internal framing pulse through said inhibit gate; means connected to said inhibit gate to record any discrepancy between the occurrence of said framing pulses; and means connected to said recording means and responsive to a predetermined number of said discrepancies to interrupt the generation of said internal framing information until the reception of the next external framing pulse.

References Cited in the file of this patent

UNITED STATES PATENTS 2,949,503 Andrews et al. ---------- Aug. 16, 1960